United States Patent
Haverinen

(10) Patent No.: US 6,771,727 B1
(45) Date of Patent: Aug. 3, 2004

(54) METHOD AND ARRANGEMENT FOR SYNCHRONIZING INTO A DIGITAL SIGNAL AND MAINTAINING SYNCHRONIZATION

(75) Inventor: Anssi K. Haverinen, Plainview, NY (US)

(73) Assignee: Nokia Multimedia Terminals Oy, Helsinki, Nokia Group (FI)

( * ) Notice: Subject to any disclaimer, the term of this patent is extended or adjusted under 35 U.S.C. 154(b) by 736 days.

(21) Appl. No.: 09/672,193

(22) Filed: Sep. 28, 2000

(30) Foreign Application Priority Data

Sep. 28, 1999 (FI) .............................................. 19992076

(51) Int. Cl.[7] ................................................ H04L 7/00
(52) U.S. Cl. ...................... 375/365; 340/3.2; 375/367; 375/134
(58) Field of Search ..................... 380/261; 375/365; 340/3.2

(56) References Cited

U.S. PATENT DOCUMENTS

| | | |
|---|---|---|
| 4,434,498 A | 2/1984 | Mathieu |
| 4,573,172 A | 2/1986 | Grimaldi |
| 4,864,565 A | 9/1989 | Schuster et al. |
| 5,301,195 A | 4/1994 | Hasegawa |
| 5,331,668 A | 7/1994 | Tanaka |
| 5,490,147 A | 2/1996 | Kubo |
| 5,608,734 A | 3/1997 | Sandler et al. |
| 5,615,237 A | 3/1997 | Chang et al. |
| 5,621,773 A | 4/1997 | Varma et al. |
| 5,854,794 A | 12/1998 | Pawlowski |
| 5,974,104 A | 10/1999 | Dhara |
| 6,594,327 B1 * | 7/2003 | Radi .......................... 375/356 |

FOREIGN PATENT DOCUMENTS

GB          1453790          10/1976

OTHER PUBLICATIONS

CCITT Tecommendaiton No. G. 704.
European Telecommunications Standard No. ETS 300 800.

* cited by examiner

Primary Examiner—Stephen Chin
Assistant Examiner—Harry Vartanian
(74) Attorney, Agent, or Firm—Ware, Fressola, Van Der Sluys & Adolphson LLP

(57) ABSTRACT

A method and a device are provided for acquiring synchronization to a received digital signal. The signal consists of consecutive frames with a frame synchronization pattern distributed over a significant part of a frame. A number of blocks of constant length (303) are received (302) and a passage is selected (304) from the same location within each received block. A regularly occurring bit value is observed (305, 306) at a constant bit position within the selected passages. As a response to an observed regularly occurring bit value, the corresponding position in the received digital signal is used (308, 309) as a starting point, and the rest of the distributed frame synchronization pattern is located within the received digital signal.

8 Claims, 6 Drawing Sheets

METHOD AND ARRANGEMENT FOR SYNCHRONIZING INTO A DIGITAL SIGNAL AND MAINTAINING SYNCHRONIZATION

TECHNICAL FIELD

The invention applies generally to the field of obtaining and maintaining synchronization to a digital signal. Especially the invention applies to the task of obtaining and maintaining frame synchronization when the received digital signal comprises a constant frame alignment signal which is a bit sequence distributed over a relatively long frame length.

BACKGROUND OF THE INVENTION

Synchronization to digital signals in general has been treated for example in the patent publication U.S. Pat. No. 4,434,498, where a digital signal is formed from successive words that represent samples of sound information comprising silent periods. The receiving device stores the words into a memory as they arrive. The stored words are read at a local clock frequency. The receiving device determines the filling rate of the memory and compares this rate with a given allowed range. If the filling rate is not within the range, the receiving device modifies the contents of the memory when the next silent interval appears.

The patent U.S. Pat. No. 4,573,172 presents a programmable circuit for the serial-parallel transformation of a digital signal. The solution comprises also a circuit for detecting the appearance of certain synchronizing words in the digital signal. A parallel clock signal is generated by a programmable divider from the clock frequency of the serial signal. The circuit monitors the coincidences between the parallel clock signal and pulses characteristic of the times when synchronizing words are detected. A logic circuit transfers an indication to a sync control input of a programmable divider when a predetermined programmable number of successive non coincidences or coincidences has been detected.

The patent U.S. Pat. No. 5,331,668 discloses a communication control device in which a clock frequency for processing communication data is the same as or lower than the transfer speed of the communication data. The author promises that a complicated construction of the input-output portion to the network is not required, so it should be possible to realize low power consumption and easy design and manufacture of the device.

The CCITT (Comité Consultatif International Téléphonique et Télégraphique) Recommendation number G.704 and the European Telecommunications Standard number ETS 300 800 determine a so-called T1 extended superframe or ESF structure, which consists of 4632 bit positions. A majority of these bit positions are used for payload data, while certain bit positions belong to a so-called overhead. Six specifically determined overhead bits constitute the Frame Alignment Signal or FAS for the extended superframe. These FAS bits are spaced 772 bit positions from each other in the extended superframe and they always have the same values, constituting the pattern "001011" when taken together in the same order in which they appear in the extended superframe. A receiver that is receiving T1 ESFs must find the repeatedly occurring FAS pattern in the received bit stream in order to establish the required knowledge about the start of each ESF and the location of more detailed data structures within the ESF. FIG. 1 illustrates some known aspects of the T1 frame and superframe structure.

Some applications require very fast synchronization to the extended superframe structure, which has prompted prior art designers to present some relatively complicated and/or processing-intensive solutions that are based either on complicated hardware logic or on pattern search algorithms. The U.S. Pat. No. 5,490,147 presents a frame alignment circuit where a shift register is used for accumulating serial data. A latch circuit converts the accumulated data into parallel data, and a programmable counter divides the associated serial clock signal into a divided, parallel clock signal. The frame alignment circuit further includes a pattern detector which should detect a frame alignment pattern of the parallel data. A separate determining circuit determines a deviation of alignment based on a reference frame alignment signal and the detected frame alignment pattern. Additionally there is a shift controlling circuit for controlling the dividing ratio of the programmable counter based on a deviation of alignment signal output by the frame alignment circuit.

The patent U.S. Pat. No. 5,621,773 is directed especially for providing and maintaining synchronization to T1 extended superframes. The disclosed device includes a memory for storing a complete extended superframe of received data. A pattern detector detects patterns in the memory that match the predetermined FAS signal. A given memory address corresponds to a particular bit position within the received data. When a pattern is detected, the corresponding address is stored into a register, and an associated counter is set to one. Subsequent pattern matches and violations at that address cause the counter to increment and decrement, respectively. Decrementing to zero makes the register available for storing a new address. In-sync is declared when a counter exceeds a certain threshold. Correspondingly out-of-sync is declared when that counter falls to another threshold or below. The synchronizer continues to search for alternative candidates even after in-sync has been declared.

The problems o the prior art solutions are associated with their excessive requirements of either memory size or processing capacity or both. Especially for fast prototyping purposes the designers often use FPGAs or Field Programmable Gate Arrays, where the implementation of large memories becomes problematic.

SUMMARY OF THE INVENTION

It is therefore the object of the present invention to provide a method and an arrangement for synchronizing to a digital signal and maintaining synchronization with low requirements of memory size and processing capacity. It is an additional object of the invention that it is readily applicable to prototyping with Field Programmable Gate Arrays.

The objects of the invention are achieved by summing several signal frames, or passages taken from a constant position within several signal frames, and looking for peaks that reveal a constant bit value at a certain bit position within the summed entities.

The method according to the invention is characterized in that it comprises the steps of receiving a number of frames selecting a passage from the same location within each received frame observing a regularly occurring bit value at a constant bit position within the selected passages as a response to an observed regularly occurring bit value, using the corresponding position in the received digital signal as a starting point and locating the rest of the distributed frame synchronization pattern within the received digital signal.

The invention also applies to a receiving device which is characterized in that it comprises memory means for storing a combination of passages taken from a constant location within a number of received frames observing means for observing a regularly occurring bit value at a constant bit position within the stored combination control means for using the position in the received digital signal corresponding to the location of an observed regularly occurring bit value as a starting point and locating the rest of the distributed frame synchronization pattern within the received digital signal.

The research which led to the present invention revealed that the requirements of memory space and processing capacity can be considerably loosened if we allow the synchronization to take a somewhat longer time. According to the invention the receiving device receives a number of consecutive frames (which may be for example T1 extended superframes) and selects either certain complete frames or certain passage from a constant location within each frame of a group of accumulated frames. The selected entities are summed bitwise to each other. If there is at a certain bit position an essentially constant bit value in each summed entity, a peak value starts accumulating at the corresponding bit position in the summing result as the summing proceeds. If only a passage is selected from a constant location within each frame of a group of accumulated frames and no peaks seem to be appearing, it is possible to change the location from which the passage is taken within the frames.

To reliably detect a frame alignment signal the receiving device should find a correct peak value at each bit position which corresponds to a known location of a frame alignment bit. The (pseudo-)random nature of the rest of the bits in the frames tends to even out the summing result at all other bit positions. However, it is possible that peaks accumulate also at some other bit positions due to other regularly occurring bit patterns or even as one potential result of randomness. Therefore it is advantageous for the receiving device to check the validity of obtained synchronization by calculating a checksum that is a part of the frame structure.

After synchronization has been achieved, its validity is monitored by checking the values of the frame alignment bits most advantageously in each received frame or alternatively in a sample of received frames. Additionally or alternatively the validity of checksums may be monitored in received frames. Here we use the concept "frame" generally to refer to all such repeatedly occurring structures in the received bit stream that are applicable to the detection of alignment bits and calculation of checksums. If the monitoring shows that synchronization has been lost, the procedure for sync acquisition is started again.

BRIEF DESCRIPTION OF THE DRAWINGS

The novel features which are considered as characteristic of the invention are set forth in particular in the appended Claims. The invention itself, however, both as to its construction and its method of operation, together with additional objects and advantages thereof, will be best understood from the following description of specific embodiments when read in connection with the accompanying drawings.

BEST MODE FOR CARRYING OUT THE INVENTION

Figure 1:
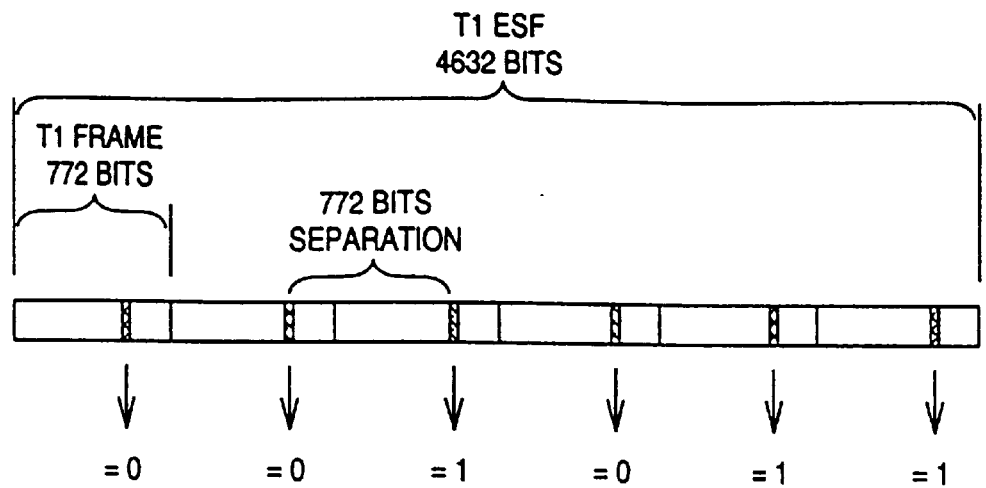
FIG. 1 illustrates conceptually a T1 extended superframe.

FIG. 1 has been treated above in the description of prior art, so the following discussion will focus on FIGS. 2 to 7.

Figure 2:
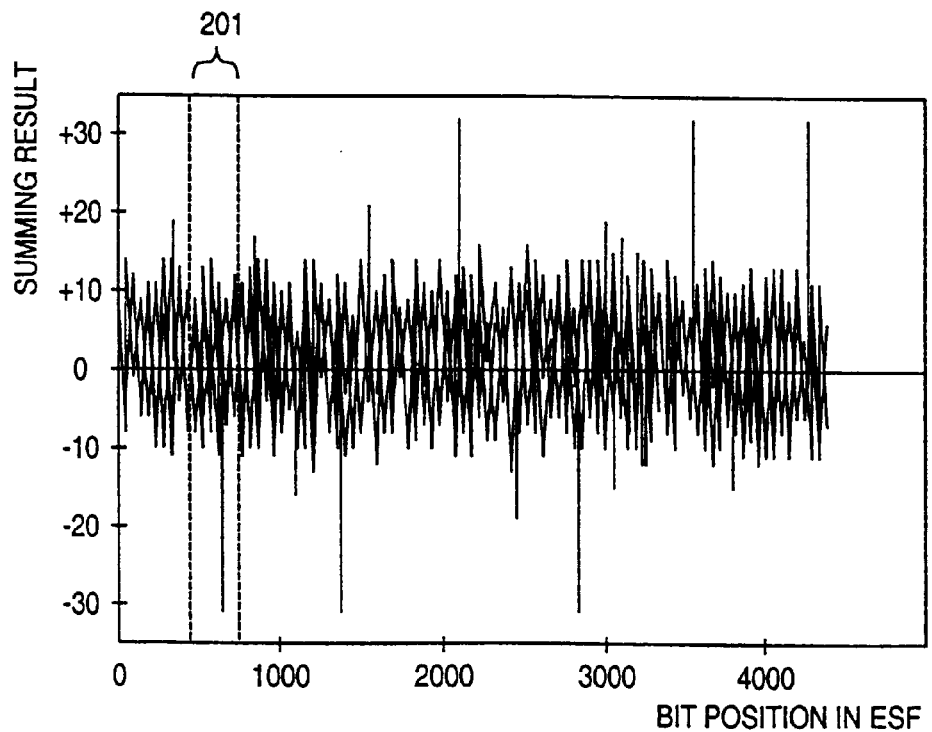
FIG. 2 illustrates a summing result and a sliding window.
Figure 3:
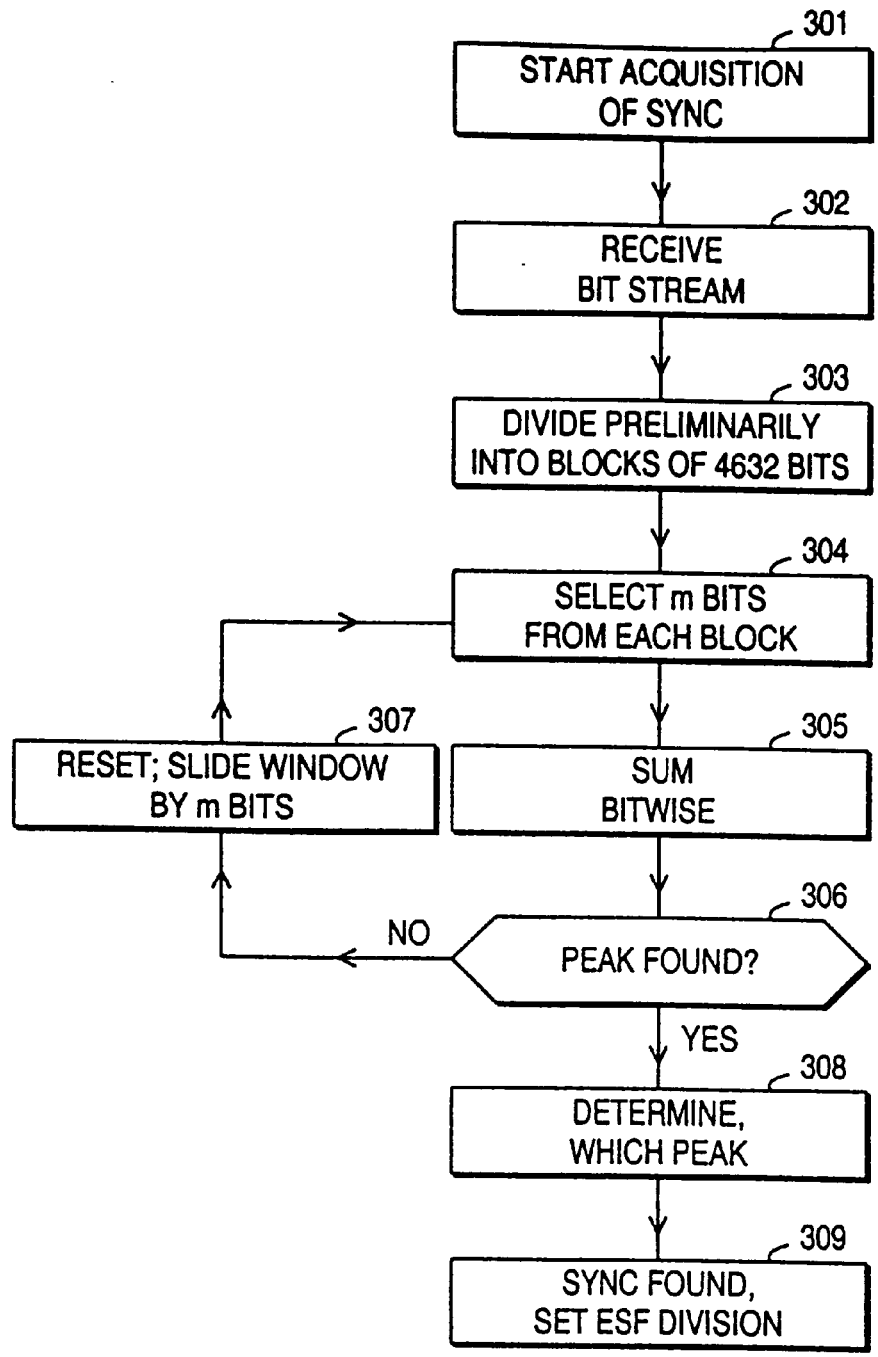
FIG. 3 illustrates a principle of an advantageous embodiment of the invention.

FIG. 2 is a schematic summing result diagram which shows approximately how the result of summing bitwise together 32 consecutive T1 extended superframes would look like. The diagram may also be designated as the correlation function of the examined ESFs. The horizontal axis represents bit positions within the T1 ESF structure and the vertical axis shows the summing result for each bit position. Summing or correlating in the sense of FIG. 2 means that each bit value "1" in an ESF is taken into account as +1, and each bit value "0" in an ESF is taken into account as −1. Almost all bit positions within the ESF have essentially arbitrary values, which results in the summing result to consist mainly of a white noise type distribution which lies almost symmetrically on the upper and lower sides of the zero axis. However the FAS bits which are at constant locations 772 bit positions apart always have the same values. Therefore there are major peaks downwards and major peaks upwards in the summing result so that the absolute value of each peak is the same as the number of extended superframes which were summed together, i.e. 32. The three peaks reaching −2 are the result of the three "0" bits in the FAS pattern and the other three peaks reaching +32 come from the three "1" bits in the FAS pattern.

FIG. 2 also illustrates the concept of a summing window 201. It is naturally possible to take complete T1 extended superframes as inputs to the summing, but this requires a relatively large amount of memory. Later in this description we will discuss embodiments of the invention where the summing is only performed over a certain summing window. This means that from the ESFs to be used for synchronization, only a certain passage or a certain number of bit positions are taken as inputs to the summing. An exemplary location of a summing window 201 in relation to the ESF structure is shown in FIG. 2. This exemplary location is good in the sense that one of the FAS peaks happens to be located within it. In the embodiments of the invention where a summing window is used it is the task of the receiving device to a good location for the window so that at least one of the FAS peaks is correctly found.

In order to maintain clarity the following discussion will focus especially on the application of the invention to T1 extended superframe synchronization. In accordance with FIG. 3 the sync acquisition process according to an advantageous embodiment of the invention starts so that a receiving device receives a digital bit stream at step 302 and divides it preliminary into consecutive blocks of 4632 bits at step 303. At this stage the division of blocks is arbitrary, because the receiving device does not have any knowledge about the correct location of frame or ESF boundaries. At step 304 the receiving device selects m bits from each block, i.e. sets the summing window, and at step 305 it performs the bitwise summing over n consecutive blocks. The invention would actually not require each consecutive block to be taken into account, but since leaving one or more blocks away would hardly have any positive impact but just increase the time used for sync acquisition, we may well assume that every consecutive block up to the n:th one is taken into account. In a practical implementation the steps 303, 304 and 305 are usually combined so that once a passage of m bits has been taken as an input to the summing operation, F-m next bits at the input are discarded where F is the extended superframe length (here F=4632) and a new passage of m bits is taken as an input to the summing.

At step 306 the receiving device inspects, whether or not a peak has been found within the summing window. Finding a peak means that one of the current values in the summing window is found to be greater than a predetermined threshold value, also known as the peak detection level. If no peaks are found, the summing results are reset and the summing window is slid by m bit positions in relation to the currently valid block division at step 307. The accumulation of new summing results starts from step 304.

If a peak is found, the receiving device tries to determine at step 308 which one of the six possible peaks it has found. The determination is most easily done by receiving a complete block of 4632 bits starting from the location that corresponds to the peak that was found, and checking the bit value that corresponds to the bit position where the peak was found as well as the bit values at the bit positions displaced by 772 bit position intervals from it within the block. Because the location of FAS bits with values "0" and "1" within the ESF is known, from the detected bit values at said bit positions it is easy to determine, where within the block is the correct boundary between subsequent ESFs. Step 309 refers to the setting of the block division at the input so that thereafter each separately received block of 4632 bits is a complete ESF.

The detection of a peak involves some uncertain factors. Firstly it may happen that within the summing window two or more peaks are found, in which case at least one of them must relate to other substantial regularity in the consecutive ESFs than the FAS bits (taken that the window is not longer than 772 bit positions). If one of the peaks is taken as the starting point and the above-explained bit positions are examined from the next complete block of 4632 bits, the correct FAS pattern should not be found if the peak was not FAS-related. Another peak may be tried as the starting point until the correct FAS pattern is found in the next complete block of 4632 bits.

Secondly it may happen that even if a "false" peak was chosen as the starting point, the next complete block of 4632 bits will comprise, completely by chance, such bit values located at 772 bit positions from each other that together they constitute a correct-looking FAS pattern. To make sure that such an event does not cause an erroneous sync found declaration, the method according to FIG. 3 should include a check where the receiving device uses the apparently found ESF boundary to locate the CRC (Cyclic Redundancy Check) checksum of that ESF and recalculates it for comparison. Only if the recalculated checksum is the same as the one apparently found in the ESF, is the synchronization declared to be found.

We may briefly analyze the time that it will be likely to take to find the synchronization, as well as the required amount of memory. It is immediately obvious that both will depend on the length of the summing window. If the length of the summing window is 722 bit positions, there will be no need for sliding it anywhere since it is completely certain that exactly one FAS-related peak will appear in the window. The optimal situation is the one where after summing over n consecutive blocks of 4632 bit positions a single peak is found in the window, and during the reception of the next block of 4632 bits the correct FAS pattern is detected at the bit positions located at 772 bit position intervals from the location of the peak. We may formulate the minimum sync acquisition time $t_{min}$ as $$t_{min}=(n+1)t_{ESF}+t_{CONF} \qquad (1)$$

where $t_{ESF}$ is the time it takes to receive 4632 consecutive bits and $t_{CONF}$ is the time the receiving device needs to confirm that the synchronization was indeed correctly found after it has received the (n+1)th block of 4632 bits.

The worst possible case is the one where every bit position within the 722-bit long summing window has a peak or a summing result the absolute value of which is at least as large as the peak detection level, and additionally when the receiving device starts checking them by taking each one of them as the starting point at its turn, only the last one proves to be the FAS-related one. The worst case corresponds to a maximum sync acquisition time $t_{max}$ which we may write as $$t_{max}=(n+772)t_{ESF}+772t_{CONF} \qquad (2)$$

The memory requirement $M_n$ of the above-explained arrangement, is one memory location for each bit position in the summing window so that the size of that memory location is large enough to accommodate a signed summing result of n units. A mathematical formulation is $$M_n=772(\log_2(n)+\text{sign\_bit}) \qquad (3)$$

which gives for example $M_n$=4632 bits for n=32.

Next we will analyze the effect of shortening the summing window on the time that it will take to find the synchronization, as well as the memory requirements. Let us assume that the length of the summing window is m bit positions, where m <772. Now it is not certain that an FAS-related peak will appear in the summing window after a single summing round, but it is possible. Therefore the minimum sync acquisition time remains the same and is defined by formula (1). The maximum number of times which the summing window needs to be shifted is 772/m, and a worst case scenario is such where each shifting of the summing window is preceded by a wasted check through m received possible FAS locations as a result of m false peaks appearing in the summing window. The maximum time for sync acquisition is $$t_{max}'=[(n+m+1)t_{ESF}]772/m+772t_{CONF} \qquad (4)$$

and the amount of required memory is just $$M_n'=m(\log_2(n)+\text{sign\_bit}) \qquad (5)$$

which gives e.g. $M_n$='384 bits for n=32 and m=64. It is easily seen that shortening the summing window from 772 to 64 bit positions has a relatively insignificant effect on the maximum time for sync acquisition, while it simultaneously reduces the amount of required memory by a factor of 12. It should be noted, however, that the average sync acquisition time will be somewhat longer if a shortened summing window is used instead of a full 722 bit positions window.

The selection of the summing parameter n and the peak detection level have also some influence to the sync acquisition. The role of the parameter n is readily seen from formulas (1) to (5): the smaller the value of n, the shorter all calculated times will be and the less memory will be required. However, if the value of n is very low, the probability of false peaks reaching the peak detection level increases, which will certainly lengthen the average peak acquisition time. The peak detection level is related to the sync acquisition's sensitivity to BER or bit error ratio: if it has a value equal to n, a single bit error in the received bit stream may cause a relatively long delay in sync acquisition, because a FAS-related peak may be ignored as not reaching the detection level. Lowering the peak detection level reduces the sync acquisition's sensitivity to BER, but simultaneously it again increases the probability of detecting false peaks.

Suitable values for n, m and the peak detection level are most advantageously found by simulating or experimenting with real T1 extended superframes. The selection of values is a compromise between algorithm reliability, average and maximum sync acquisition time as well as the amount of required memory.

Figure 4:
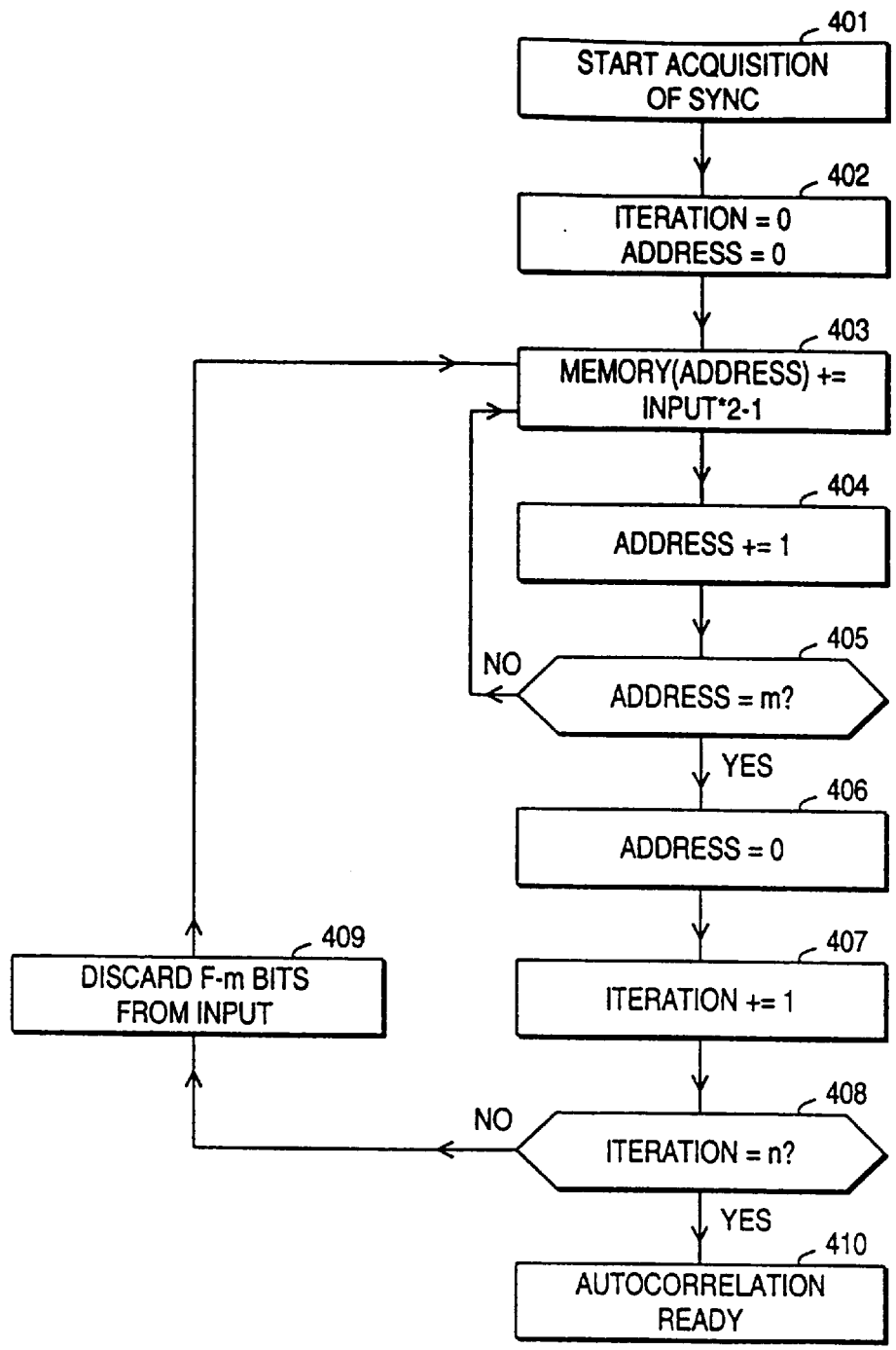
FIG. 4 illustrates an advantageous correlation calculation method according to an embodiment of the invention.

FIG. 4 is a more detailed flow diagram of an exemplary method for calculating the correlation of selected passages of a received bit stream. The calculation of correlation starts at step 401. Step 402 means the initialization of the variables "iteration" and "address" to 0; the former is used to keep track of the number of passages that are summed together and the latter means the current bit position within the summing window. Step 403 is the actual summing step. Here the contents of the memory location indicated by the current value of the "address" variable are updated by +1 or −1 depending on whether the currently read input bit is 1 or 0 respectively. Here we assume that reading an input bit means "eating" it so that next time the subsequent bit is available as the input bit. The mathematical operator "+=" means updating: for example A+=B means "take the current value of A, add B to it and store the result instead of the previous value of A". Step 404 means just incrementing the value of the "address" variable by one so that the next bit position in the summing window becomes under concern, and at step 405 it is checked whether the end of the summing window has been reached.

A negative finding at step 405 means a jump back to step 403, and a positive one causes the "address" variable to be reset at step 406. The value of the "iteration" variable is incremented by one at step 407, and at step 408 it is checked whether the intended number of summings has been reached. If not, the method branches to step 409 which means waiting until the corresponding m-bit-long passage in the next block of F bits starts; previously we have indicated that in T1 ESFs F is equal to 4632. Thereafter the method is continued from step 403. A positive finding at step 408 means that the current calculation of the correlation is ready, which is declared at step 410.

Figure 5:
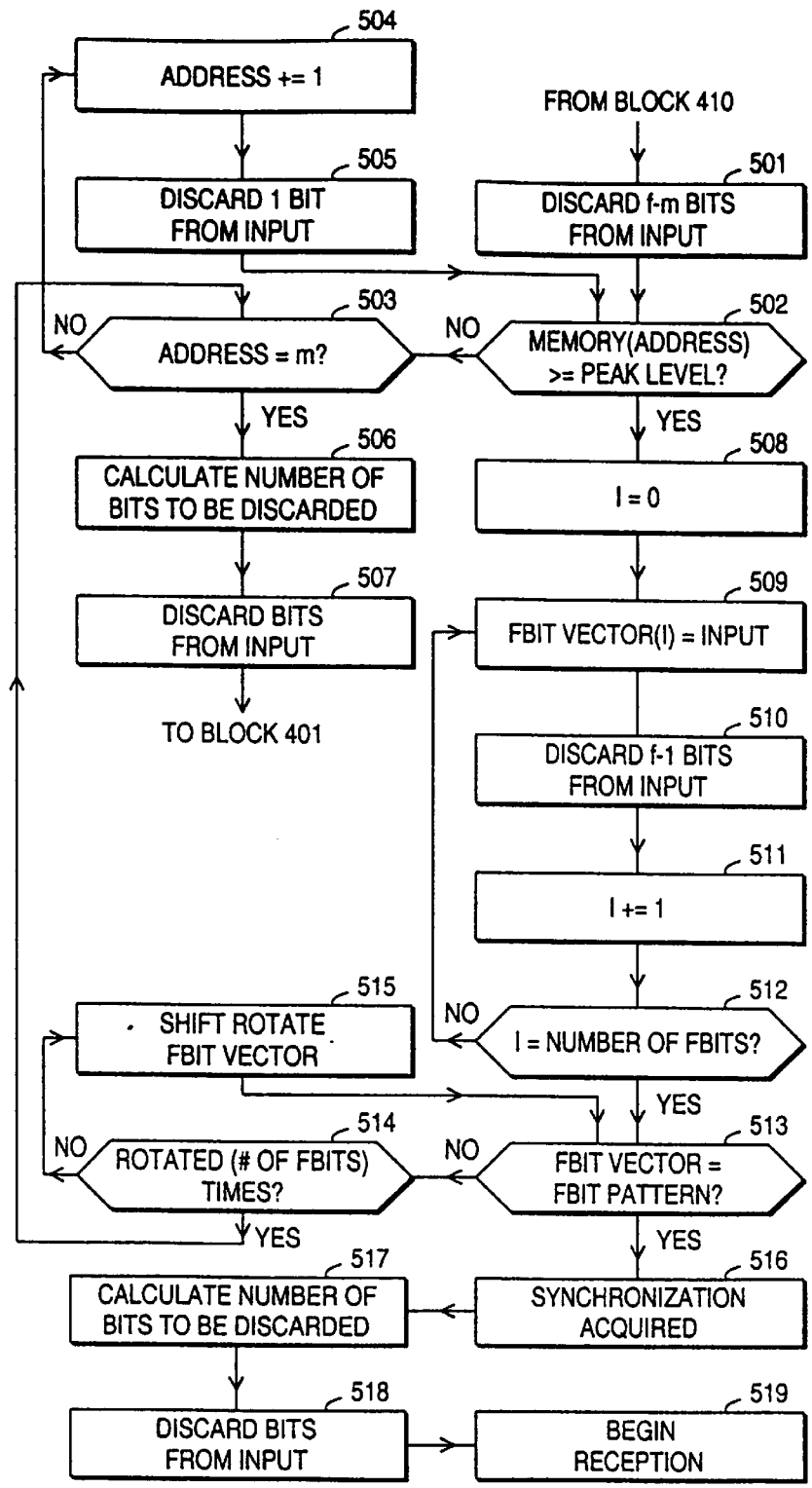
FIG. 5 illustrates an advantageous synchronization acquisition method according to an embodiment of the invention.

FIG. 5 is a detailed flow diagram of an exemplary method for using the correlation calculated in accordance with the method of FIG. 4 to attempt achieving synchronization. We may recall that after block 410 the value of the variable "address" is zero, meaning that the first bit position of the memory block holding the summing result is under consideration. We may further recall that after block 410 the bit that appears at the input of the sync acquisition circuit is the first bit following the summing window. In order to establish an "f-shifted synchronism" between the summing result in the memory and the bits in the input, f-m bits are discarded from the input at step 501. Here f is the number of bit positions between successive FAS bits, i.e. 772, and m is the length of the summing window as mentioned previously. The reason behind said "f-shifted synchronism" becomes apparent through the following description.

Step 502 corresponds to determining whether there is a peak at the currently considered bit position in the summing window. A negative finding causes the value of the "address" variable to be checked against m at step 503 to determine whether the whole summing window has been searched. If not, the value of the "address" variable is incremented by one at step 504, one bit is discarded from the input at step 505 to keep the input in "f-shifted synchronism" with the memory address, and step 501 is returned to. A positive finding at step 503 means that the end of the summing window has been reached without finding a valid FAS peak. Step 506 corresponds to calculating, how many bits should be discarded at the input to reach a state where the bit that appears at the input of the sync acquisition circuit is again the first bit following the previously used summing window. In other words, step 506 implements the previously discussed shifting of the summing window by m bits. The actual discarding is done at step 507, after which a new calculation of correlation may start in accordance with step 401 of FIG. 4.

A positive finding at step 502 means that there is a peak in the summing result at the current memory location. A variable I is reset to zero at step 508. Step 509 means that the current input bit is read so that it becomes the I:th bit of a vector FBITS, which has as many bits as in the FAS pattern which is looked for. In the present T1 ESF context, the FBITS vector has consequently six bits. Because the "f-shifted synchronism" between memory locations and input bits has been maintained, the current input bit comes from the received bit stream and is exactly f bits (here, 772 bits) behind the position in the summing window where a peak was just found. This is the fastest way of starting the accumulation of assumed FAS bits into the FBITS vector.

The loop through steps 510, 511 and 512 and eventually back to step 509 means that the FBITS vector is filled with assumed subsequent FAS bits read from the input stream. A total of f-1 intermediate bits are discarded each time at step 510, because the FAS bits are located f bits apart. In order to keep track of the filling factor of the FBITS vector the variable I is incremented by one each time at step 511. If the check at step 512 indicates that not all assumed FAS bits have been collected, step 509 is returned to.

Only after the check at step 512 has indicated that the FBITS vector is full, the process continues to step 513. The current form of the FBITS vector is compared against the known FAS pattern. If there is no match, it is checked at step 514 whether all shift-rotated permutations of the FBITS vector have been already tried. If not, the bit values in the FBITS vector are shift rotated by one at step 515 and a new comparison is made at step 513. A positive finding at step 514 means that all shift-rotated permutations have indeed been tried without a match, which means that the peak found at the current memory location was a false one. In such a case a return to step 503 occurs.

A positive finding at step 513 means that starting from a peak at a current memory location there has been found a pattern in the received bit stream that is the same as the known FAS pattern. There remains the danger that this happened only by chance after a false peak was selected as the starting point, but here we assume that the CRC check that should reveal such an error is implemented as a part of the tracking algorithm and not as a part of the currently described sync acquisition algorithm. Therefore it is declared at step 516 that synchronization has been acquired. Step 517 means that the matching shift rotated permutation of the FBITS vector as well as the known position of the summing window and the address of the peak found therein are taken into account to determine, how many bits more must be discarded from the input to arrive exactly at the following boundary between consecutive extended superframes. The actual discarding is done at step 518, and the acquisition process ends at step 519 where the actual synchronized reception of extended superframes may begin.

Figure 6:
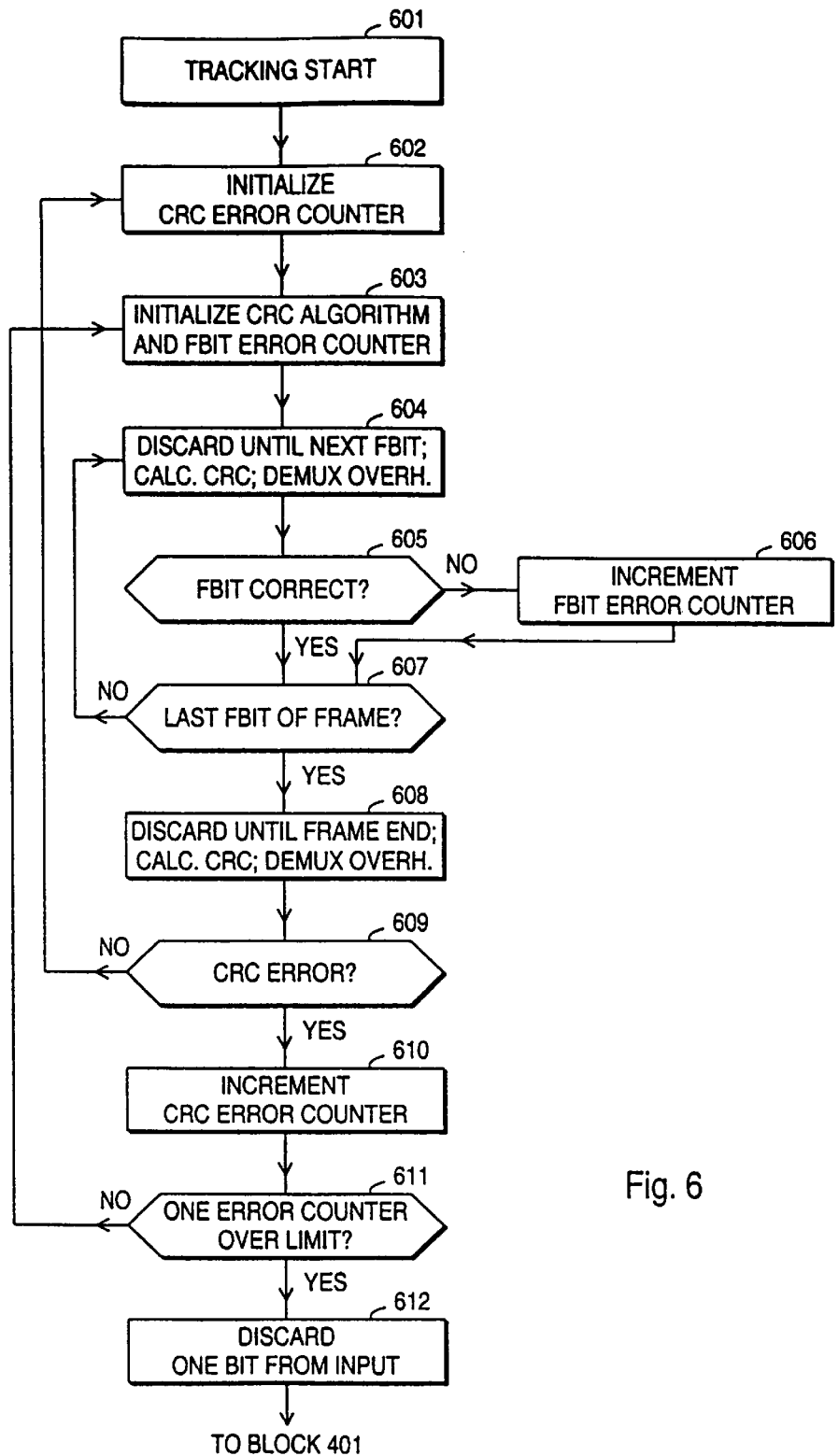
FIG. 6 illustrates an advantageous tracking method according to an embodiment of the invention and FIG. 7 illustrates an exemplary hardware implementation according to the invention.

The process of monitoring the validity of an (allegedly) acquired synchronization is also known as tracking. FIG. 6 shows a detailed flow diagram of an exemplary tracking method which can be applied after sync acquisition through the methods of FIGS. 4 and 5. Tracking begins at step 601. Step 602 means the initialization of a CRC error counter, and step 603 means the initialization of a FAS bit error counter as well as a CRC calculation algorithm of a known kind that it is used to calculate CRC checksums over parts of T1 ESFs. At step 604 bits are discarded from the input until the next FAS bit (designated as FBIT in FIG. 6), at the occurrence of which the first CRC checksum is calculated and the overhead bits are demultiplexed from the bitstream. At step 605 it is checked, whether the current FAS bit in the bit stream has the value which it should have according to the system specifications. A negative finding causes the method to loop through step 606, where the FAS bit error counter is incremented to show that an erroneous FAS bit was found. Otherwise the method continues to step 607, where it is just checked whether the current FAS bit was the last one in the current T1 extended superframe. A negative finding causes a jump back to step 604.

After a positive finding at step 607 enough bits are discarded at step 608 to reach the end of the current T1 extended superframe. A CRC checksum is again calculated and overhead bits demultiplexed at step 608. If a CRC error is not found, the potentially accumulated FAS bit errors are ignored and the process is repeated from step 602 concerning the next T1 ESF. If a CRC error is found at step 609, the CRC error counter is incremented at step 610. At step 611 it is checked, whether at least one of the error counters has exceeded the limit of acceptable erroneousness. If not, the process is repeated from step 603 concerning the next T1 ESF. A positive finding at step 611 means that synchronization to the extended superframe structure has been lost. In such a situation the receiving device is again in "complete darkness" in the sense that it does not know, where to start looking for the new synchronization, so the fastest way to restart sync acquisition can be used just as well as any other, meaning that just one bit is discarded from the input at step 612 before returning to step 401 of FIG. 4.

Figure 7:
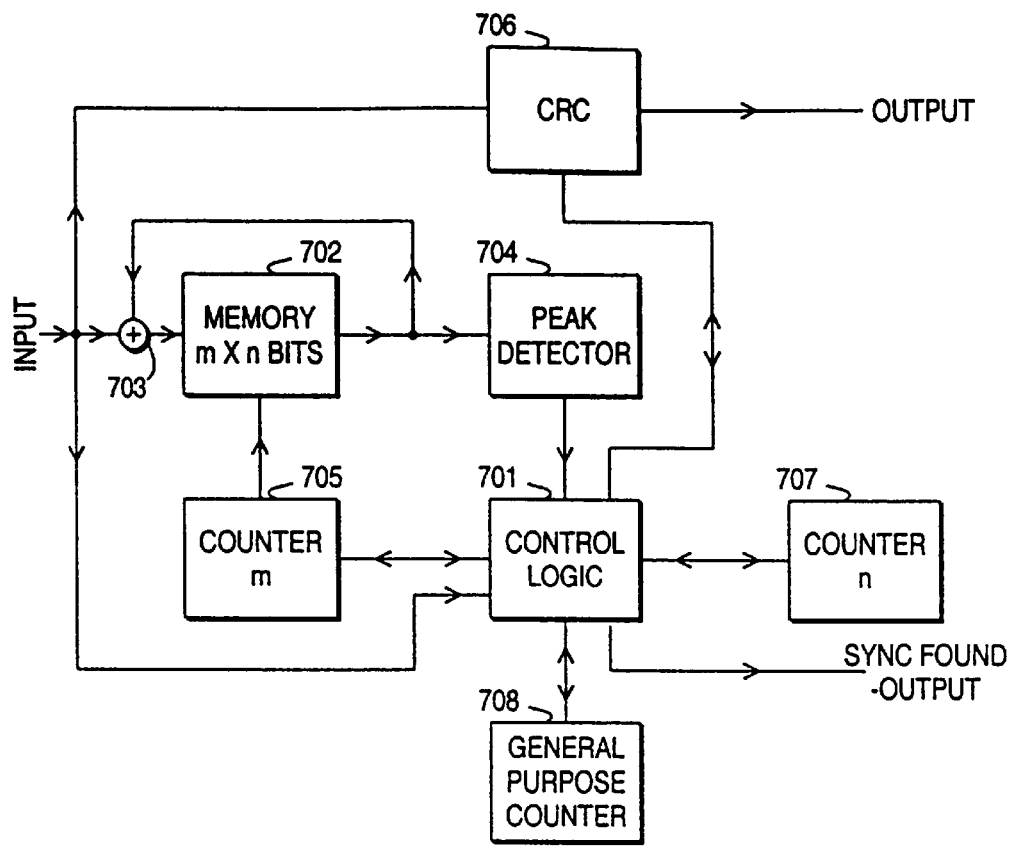

FIG. 7 illustrates an exemplary hardware implementation that can be used to implement the above-explained methods. The control logic 701 is a state machine that is arranged to operate according to the flow charts of FIGS. 4, 5 and 6. The memory 702, the adder 703, the peak detector 704 and the m-counter 705 implement the means for calculating the correlation. The CRC block 706 is arranged to calculate the CRC checksums as is known as such from the technology of digital video broadcasting. The n-counter 707 and the general purpose counter 708 are needed for keeping track of bit positions in the ESFs and for counting CRC and FAS bit errors during the tracking mode.

In order to control and take advantage of the operation of the other blocks the control logic block has a number of connections to them. The peak detector 704 is arranged to announce to the control logic block 701 whenever it finds a value in the summing window results that exceeds a predefined peak level threshold. The m-counter 705 is arranged to give memory addresses to the memory 702. The control logic 701 is arranged to give reset and enable signals to the counters 705, 707 and 708 and additionally a start value indication to the general purpose counter 708. All counters are arranged to give a count ready indication to the control logic block 701. The control logic block 701 is further arranged to give enable and initialization signals to the CRC block 706, and said block is arranged to give CRC error indications to the control logic block 701. The state of acquired synchronization is arranged to be indicated through a separate output from the control logic block 701.

What is claimed is:

1. A method for acquiring synchronization to a received digital signal consisting of consecutive frames with a frame synchronization pattern distributed over a significant part of a frame, characterized in that it comprises the steps of receiving (302) a number of blocks of constant length (303)

selecting (304) a passage from the same location within each received block observing (305, 306) a regularly occurring bit value at a constant bit position with the selected passages by combining the selected passages bitwise to obtain a combination result and searching for a peak within the combination result as a response to an observed regularly occurring bit value, using (308, 309) the corresponding position in the received digital signal as a starting point and locating the rest of the distributed frame synchronization pattern within the received digital signal.

2. A method according to claim 1, characterized in that the substep of combining (305) the selected passages bitwise to obtain a combination result comprises the sub-substep of performing a bitwise summing (403, 404, 405) where each bit value X is converted to (2-X)-1 before summing.

3. A method according to claim 1, characterized in that it comprises the step of responding to a situation where no such regularly occurring bit value has been found at a constant bit position within the selected passages that would have lead to locating the rest of the distributed frame synchronization pattern within the received digital signal by shifting (307) the location from which the passages are selected and repeating the steps of claims 1.

4. A method for acquiring synchronization to a received digital signal consisting of consecutive frames with a frame synchronization pattern distributed over a significant part of a frame, characterized in that it comprises the steps of receiving (302) a number of blocks of constant length (303)

selecting (304) a passage from the same location within each received block observing (305, 306) a regularly occurring bit value at a constant bit position with the selected passages as a response to an observed regularly occurring bit value, using (308, 309) the corresponding position in the received digital signal as a starting point and locating the rest of the distributed frame synchronization pattern within the received digital signal further characterized in that it comprises the step of responding to a situation where no such regularly occurring bit value has been found at a constant bit position within the selected passages that would have lead to locating the rest of the distributed frame synchronization pattern within the received digital signal by shifting (307) the location from which the passages are selected and repeating the above steps and further characterized in that it comprises the steps of a) receiving (302) a number of blocks of constant length (303) and selecting a passage (304) from the same location within each received block b) observing (305, 306, 502) a yet unobserved regularly occurring bit value at a constant bit position within the selected passages, and if no more yet unobserved regularly occurring bit value are found (503, 506, 507), jumping to step g)

c) using the bit position in the received digital signal corresponding to said constant bit position as a starting point and reading (509) the bit value therein d) reading (510, 511, 512) the bit values at those later locations in the received digital signal, which also comprise bits of the distributed frame synchronization pattern if said bit position used as a starting point does e) comparing (513) the known frame synchronization pattern against the string of read bit values, and repeatedly performing the steps of shift rotating (515) the known frame synchronization pattern and comparing (513) the known frame synchronization pattern against the string of red bit values, until either a match is found (516) between the known frame synchronization pattern and the string of read bit values, in which case a confirmation check is performed, or all shift rotated permutations of the known frame synchronization pattern have been compared against the string of read bit values (514)

f1) if said confirmation check confirms that synchronization has indeed been found, declaring synchronization found and aborting the method (517, 518, 519)

f2) if said confirmation check fails or if all shift-rotated permutations of the known frame synchronization pattern have been compared against the string of read bit values without find a match, starting again from step b)

g) shifting by the length of the selected passages the location from which the passages are selected and starting again from step a).

5. A method according to claim 4, characterized in that the step of performing a confirmation check comprises the substep of calculating a checksum (604, 608) by taking into account such parts of the received digital signal the location of which within the digital signal is determined by the locations from which said bit values are read.

6. A receiving device for receiving a digital signal and acquiring synchronization to a received digital signal consisting of consecutive frames with a frame synchronization pattern distributed over a significant part of a frame, characterized in that it comprises memory means (702) for storing a combination of passages taken from a constant location with a number of received blocks of constant length observing means (704) for observing a regularly occurring bit value at a constant bit position within the stored combination by combining the selected passages bitwise to obtain a combination result and searching for a peak within the combination result control means (701) for using the position in the received digital signal corresponding to the location of an observed regularly occurring bit value as a starting point and locating the rest of the distributed frame synchronization pattern within the received digital signal.

7. A receiving device according to claim 6, characterized in that it comprises also confirmation checking means (706) for confirming that the distributed frame synchronization pattern has been correctly located with the received digital signal.

8. A receiving device according to claim 7, characterized in that said confirmation checking means is a checksum calculator (706).

\* \* \* \* \*